June 28, 1960     W. R. RICKEL ET AL     2,942,447
CLOTHES WASHING AND EXTRACTING MACHINE Filed Aug. 7, 1957     7 Sheets-Sheet 1

Fig.1

INVENTORS
WILLIAM R. RICKEL
WILLIAM W. SYLES
BY
*Hill, Sherman, Meroni, Gross & Simpson*
ATTORNEYS June 28, 1960  W. R. RICKEL ET AL  2,942,447
CLOTHES WASHING AND EXTRACTING MACHINE
Filed Aug. 7, 1957  7 Sheets-Sheet 4

INVENTORS
WILLIAM R. RICKEL
WILLIAM W. SYLES
BY
ATTORNEYS

Inventors
William R. Rickel
William W. Syles

United States Patent Office 2,942,447
Patented June 28, 1960

2,942,447

CLOTHES WASHING AND EXTRACTING MACHINE

William R. Rickel and William W. Syles, St. Joseph, Mich., assignors to Whirlpool Corporation, St. Joseph, Mich., a corporation of Delaware Filed Aug. 7, 1957, Ser. No. 676,815

18 Claims. (Cl. 68—24)

This invention relates generally to the art of cleaning textiles and similar materials and more specifically relates to improved apparatus for cleaning materials such as clothes or the like.

The present invention relates specifically to a combination washer and dryer wherein the steps of washing, rinsing, extracting and drying may be carried out in one continous operation and wherein all such functions are combined in a single machine.

It is an object of the present invention to provide a laundry machine which operates at slow speed and extracts at high speed and which is characterized by the provision of gradual acceleration between the slow and high speeds over an appreciable period of time in a range from about 5 to 30 seconds.

A still further object of the present invention is to provide a variable drive pulley assembly for a two-speed driving means wherein the pivotally mounted dual pulley idler unit is gradually actuated over an appreciable period of time of at least about 5 seconds, thereby to gradually accelerate the drive means between its upper and lower limits.

Many other advantages, features and additional objects of the present invention will become manifest to those versed in the art, upon making reference to the detailed description which follows and the accompanying sheets of drawings in which a preferred structural embodiment of the present invention is described by way of illustrative example.

Although the principles of the present invention are of general utility in the cleaning art, a particularly advantageous application thereof is made to a combination washer-extractor-dryer apparatus wherein a batch of soiled flexible textile materials such as clothes may be cleansed in one continuous operation by a series of cycles or by a cycle which includes a series of periods, for example, washing, rinsing and drying periods, the step of drying being advantageously expedited, if desired, by an intermediate extraction procedure. The inventive principles herein disclosed may be embodied equally well in a washing machine, per se, or any other sub-combination of the preferred embodiment shown by way of illustrative example.

The exemplary machine herein disclosed embodies a rotatable container having a substantially horizontal axis wherein the walls of the container serve to confine a mass of clothes, thereby restricting the clothes for movement within a treatment zone which will include the container. It will be evident to those versed in the art, however, that the principles of the present invention will be equally applicable to structures wherein the axis of the container is tilted at angles intermediate vertical and horizontal planes and, accordingly, where the term "horizontal axis" or its equivalent expressions are herein used, they shall be deemed to include all axes dispositions which are not vertical.

Referring specifically to the drawing, the laundry machine of the present invention is indicated generally at 10 and comprises a cabinet 11 which encloses an inner stationary tub 12 having a reservoir portion 13 formed in a lower part thereof in which a pool of laundry liquid will be collected.

Within the tub 12, there is provided a rotatable foraminous basket, or drum, or container 14 having a rear wall means 16 connected to a centrally disposed drive shaft 17 journaled and supported in a bearing structure indicated generally at 18 which, in turn, is carried by a wall portion 19 of the stationary tub 12. An extending portion of the shaft 17 carries a pulley 20 to facilitate rotatable driving of the container 14.

Figure 1:
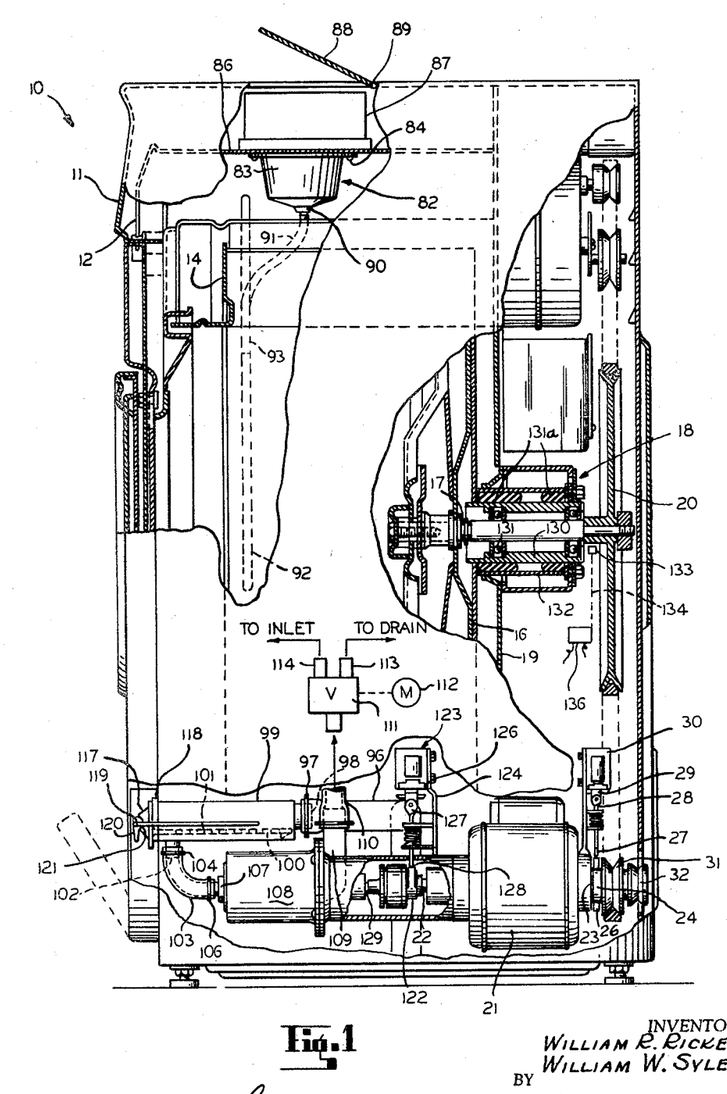
Figure 1 is a side elevational view with parts broken away and with parts shown in cross-section illustrating a laundry machine embodying the improvements of the present invention.

As shown in Figure 1, an electric drive motor 21 is provide having output shafts extending in opposite directions, there being a first output shaft portion 22 extending towards the front of the machine 10 and a second output shaft portion 23 extending towards the rear of the machine 10. A spring clutch unit 24 is operatively associated with the drive shaft 23 and includes an operating pawl 26 cooperable with a stop 27 positioned on the end of an actuator bar 28 reciprocatingly driven by a solenoid plunger 29 of an electric solenoid assembly 30.

A pulley wheel 31 is rotatably driven through the spring clutch unit 24 whenever the solenoid assembly 30 is electrically energized so that the cam follower or stop 27 which is fixedly secured to the solenoid plunger 29 is drawn upwardly out of engagement with the pawl lever or actuating member 26. The pulley wheel 31 is used to drive the impeller of a blower unit for the air system of the machine.

Also driven by the shaft extension 23 is a second pulley wheel 32 over which is trained a drive belt 33 used to power a variable drive pulley assembly shown generally at 34.

The variable drive pulley assembly 34 comprises a stationary bracket 36 connected to the casing and pivotally carrying, as at 37, a swinging frame or bracket 38 which may be generally yoke-shaped having a bight portion carrying a limit arm 39 having an adjustable lock screw 40 which engages against a base plate 41 at an end limit of travel of the bracket 38. The bracket 38 also includes two parallel legs carrying at an upper portion thereof a second yoke member 42 having an arm extension 43 characterized by the provision of a plurality of openings or apertures 44.

A speed changer return spring 46 is connected as at 47 to the arm extension 43 at one of the apertures 44 and the opposite end of the spring 46 is connected as at 48 to a stationary part of the casing, thereby presetting the tension by a selectively varied amount depending upon the choice and selection of aperture 44 to continuously bias the movable bracket 38 in one direction.

The bracket 38 carries a shaft 50 to which is journaled a plurality of pulley sheaves or pulley parts.

The pulley sheaves are 3 in number and are relatively movable in a lateral direction with respect to one another. In this particular embodiment, the two outside sheave members are relatively stationary, one of the outside sheave members being indicated at 51, the other at 51a and the middle sheave member 51b is laterally movable of the shaft 50.

The three sheave members on the shaft 50 have confronting tapering surfaces together forming first and second V-shaped pulley grooves A and B and the laterally spacing dimension between the outside pulley sheaves, including the sheave 51 and the sheave on the opposite side thereof is such that by lateral movement of the middle pulley sheave, the width of the pulley grooves may be varied.

The primary pulley belt 33 is received in one of the grooves A and a secondary pulley belt 52 is trained over the other groove B as well as over an idler pulley 53 rotatable on a shaft 54 and corotatable with a pulley 56 interconnected with the pulley 20 by a pulley belt 57.

To take an excessive slack out of the entire pulley system, a pair of tensioning springs 58, 58 are connected to a stationary part of the casing as at 59, 59 and are connected to the shaft 54 as at 60, thereby tensioning not only the pulley belt 57 but also the pulley belts 33 and 52.

Figure 3:
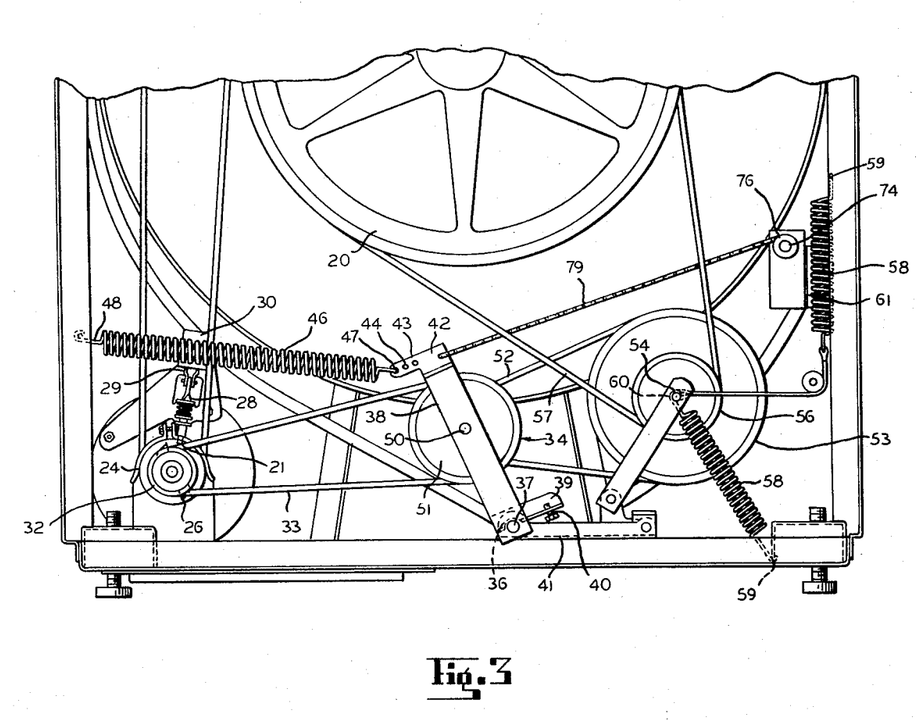
Figure 3 is a fragmentary rear elevational view with parts removed for the sake of clarity and showing particularly the improved driving means and control therefor contemplated in accordance with the principles of the present invention.
Figure 4:
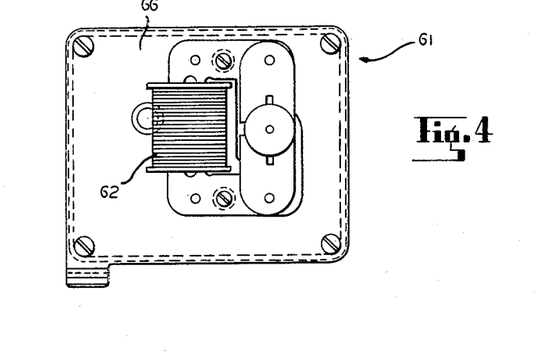
Figure 4 is a front elevational view of the control motor of the driving means shown in Figure 3.
Figure 5:
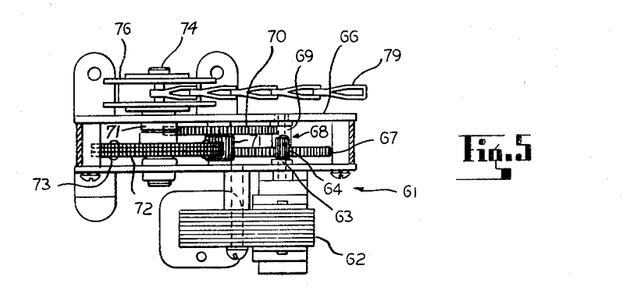
Figure 5 is a side elevational view of the control motor shown in Figure 4.

In normal operation, the spring 46 pulls the bracket 38 to the left, using the orientation of Figure 3, so that the primary or main drive belt 33 and the secondary belt 52 are in the low speed position or tumbling speed position wherein the contents of the machine are normally distributed evenly in balanced relationship and are held centrifugally against the rotating drum until near the uppermost position thereof and then dropped by gravity towards the lowermost position.

In order to increase the speed of rotation of the drum for centrifuging, the tension in the pulley system is selectively varied by actuating the bracket 38 whereupon the movable sheave member will move closely adjacent one of the outer sheave members so the relative positions of the primary and secondary drive belts 33 and 52, respectively, will be changed in radial position and the drum will be rotated at an increased speed to effect an efficient centrifuging action as is required for the extraction of liquid from the clothes contained in the drum.

Figure 6:
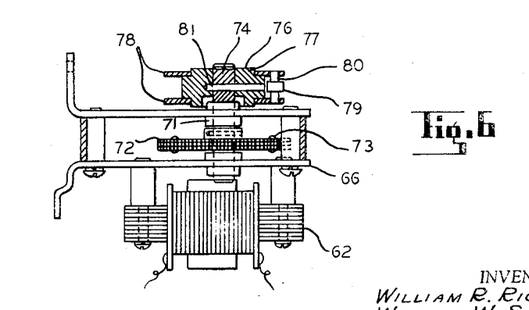
Figure 6 is a top plan view of the control motor of Figures 4 and 5.

In accordance with the principles of the present invention, the actuating mechanism or control apparatus for the speed changer device comprises a motor gear unit indicated generally at 61. The unit 61 includes an electric motor which may conveniently comprise a shaded pole motor 62 having an output shaft 63 to which is attached a pinion gear 64 operative to drive a spur gear reduction unit contained in a gear box shown generally at 66. More specifically, the gears of the gear train in the box 66 include a large gear 67 meshing with the pinion gear 64 and operative to drive a shaft 68 having a small gear 69 carried thereby. The small gear 69 meshes with a second large gear 70 which, in turn, drives a second small gear 71 meshing with a large reduction gear 72 composed of three blanked sections of steel secured together by a plurality of fasteners such as rivets 73. The large reduction gear 72 drives an output shaft 74 to which is attached a pulley 76. The pulley 76 has a hub portion 77 and radially outwardly extending flanges 78 forming a groove in which to receive a link chain 79. The chain 79 is attached at one end to a drive pin 80 carried by the pulley 76. As shown in Figure 6, the hub 77 of the pulley 76 is pinned as at 81 to the shaft 74 for corotation therewith.

When the shaded pole motor 62 of the speed changer mechanism is electrically energized, the link chain 79 is wound up on the spool portion of the pulley 76 between the flanges 78, thereby extending the speed changer return spring 46 and allowing the variable drive pulley assembly 34 to change the respective pulley diameters. Because the shaded pole motor 62 operates through the gear reduction unit 66, the final output shaft 74 rotates very slowly with respect to the initial speed of the motor output shaft 63 and, accordingly, the link chain 79 is gradually and progressively taken up on the spool portion of the pulley 76 over an appreciable period of time. Accordingly, the respective pulley diameters will be gradually and progressively changed so that the drum or cylinder speed will be gradually and progressively accelerated between ordinary tumbling speed and centrifuging speed, or in other words, between the upper and lower limits of the speed changing mechanism.

The shaded pole motor 62 continues to operate until the limit arm 39 fixedly secured to the speed changer cradle or bracket 38 with the adjustable lock screw 40 forces against the base plate 41 and thereby stalls the shaded pole motor 62. The shaded pole motor 62 remains electrically energized in the "stall" position as long as it is desired to keep the machine operating at the upper limit of speed during, for example, a centrifuging period of a washing cycle.

When the shaded pole motor 62 is no longer electrically energized, the speed changer returns spring 46 acts upon the connector bracket 38 and the link chain 79 reverses the drum wheel or take-up pulley 76 and the gear train contained within the gear box 66 whereupon the variable drive pulley assembly 34 will again change the respective pulley diameters to gradually and progressively decelerate or decrease the cylinder speed from the upper limit of speed to the lower limit of speed. By virtue of such provision, therefore, the necessity of a separate clutch assembly is completely eliminated since the gear train is effectively set in motion in either selected direction by energization of the shaded pole motor 62 or by virtue of the energy stored within the return spring 46.

The term "acceleration" will be referred to herein in its generic sense to indicate both an acceleration from a low to a high speed as well as a deceleration from a high speed to a low speed. It has been determined that the operation of the machine in accordance with the principles of the present invention is favorably enhanced through the provision of an appreciable period of time of acceleration of at least about five seconds. Generally, the transmission provided in accordance with the illustrative embodiment herein described will accelerate the two-speed driving means between the high and low speeds gradually over an appreciable period of time in the range of from about 5 to 30 seconds.

Referring further to Figure 1, there is illustrated the features of construction of a dispenser assembly for introducing conditioner additives into the machine without subjecting the contents of the machine to risk of damage. It is desirable in a laundering operation, for example, to use such conditioning additives as bleach, however, if the undiluted bleach contacts textile fibers, damage is likely to result. Accordingly, the dispenser assembly of the present invention insures that the conditioning additive may be introduced into solution with the laundry liquid before contact is made with the contents of the machine.

In Figure 1, there is shown the dispenser assembly indicated generally at 82 including a reservoir 83 attached by one or more fasteners 84 to a portion of the housing indicated at 86.

A generally rectangular-shaped entrance member 87 which is open at the top and bottom portions is fixedly secured to the top of the housing portion 86 and is aligned with the open inlet portion at the top of the reservoir 83 as well as an appropriate opening (not shown) in the housing portion 86.

An appropriate cover 88 is hinged as at 89 to the outer casing 11.

At the bottom of the reservoir 83, there is provided an outlet nipple 90 to which is attached one end of a conduit 91 such as a plastic tube.

The outer tub 12 is particularly characterized by having formed in the side wall thereof an embossed rib portion 92 which forms a groove or channel extending generally downwardly towards the reservoir 13.

The other end of the plastic tube 91 is fastened in the groove or channel provided by the rib 92 as at 93.

By virtue of such provision, therefore, the operator may manually add a conditioning additive such as liquid bleach before or during the wash or first step deep rinse cycles of operation to the bleach dispenser assembly 82, whereupon the conditioning additive immediately starts to flow through the dispenser outlet 90 and through the plastic conduit 91 for discharge into the tank or outer tub 12. The bleach flows downwardly along the embossed rib portion 92 and is intermixed with the laundry liquid such as the wash or rinsing fluid during the machine operation in the area between the outer tub 12 and the wash cylinder or container 14. Accordingly, the conditioning additive goes fully into solution with the laundry liquid and only the diluted solution comes in direct contact with the contents of the machine.

Figure 7:
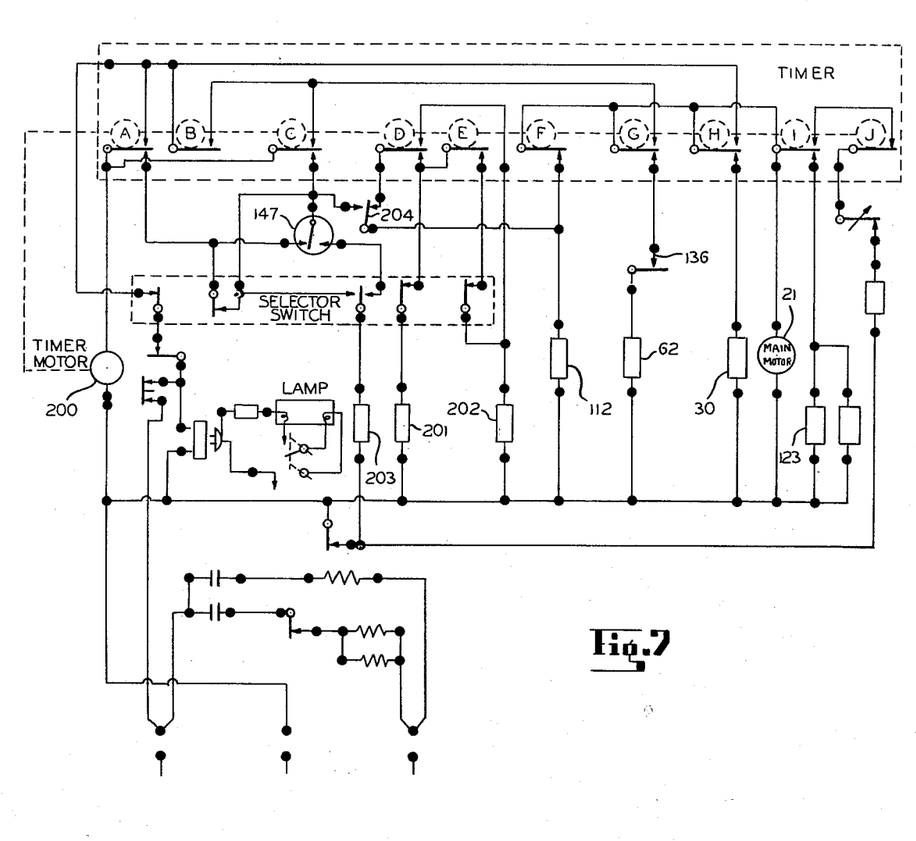
Figure 7 is a schematic drawing of the sequential control means incorporated in the laundry machine of the present invention.

A supply of laundry liquid is furnished to the machine through the usual thermostatic mixing valves electromechanically operated by solenoids controlled by the presettable sequential control means of Figure 7. The laundry liquid supplied to the machine is collected in a pool within the reservoir 13 at the bottom of the stationary tub 12 below the level of the drum 14. The reservoir 13 is provided with an outlet 94 to which is connected a conduit 96 leading to a removable filter assembly most clearly shown in Figures 1 and 2. The end of the conduit 96 is connected as at 97 to a filter inlet 98 fixedly secured to a filter housing 99 and then flows into the filter housing and through the hole portions 100 of a removable filter tray 101. The laundry liquid then flows outwardly through an outlet portion 102 formed at the forward end of the filter housing 99 and into a conduit 103 connected at one end as at 104 to the outlet 102 and connected at its opposite end as at 106 to an inlet 107 of a positive displacement pump indicated generally at 108. The pump discharges the fluid through a pump outlet shown at 109 into a conduit 110 connected to the pump outlet 109. As shown in Figure 1, the discharge conduit 110 leads to a two-way valve 111 operated by an electric motor 112 and alternatively discharges to drain as at 113 or back to the machine inlet as at 114, the conduit 114 leading to the machine inlet being shown on the left-hand side of Figure 2 connected to an inlet 116 for injecting a fan-shaped spray of liquid into the interior of the container 14 from a location approximately at the lower quadrant on one side of the drum axis towards the lower quadrant on the other side of the drum axis.

The inlet 116 may conveniently include an appropriate nozzle construction for the purposes stated.

The filter housing 99 has a front plate 117 with a resilient gasket 118 which is acted upon by a support lever 119 and a handle member 120 coacting with a cam portion 121 formed in the front plate 117 to effect a seal of the filter housing to the front plate 117.

The operator may selectively actuate the handle 120 and disengage the front plate together with the tray portion 101 connected thereto for removal of the same from the filter housing 99 whenever it is desired to purge the filter assembly of separated impurities.

In order to insure operation of the pump 108 only during those portions or periods of the laundering cycle as may be appropriate, there is provided between the pump 108 and the drive motor 21 a spring clutch 122 which interconnects the power take-off shaft 22 of the drive motor 21 with the pump 108. The spring clutch 122 is controlled by a solenoid assembly indicated generally at 123 fixedly secured to a bracket 124. When electrically energized, the solenoid plunger 126 which is fixedly secured to a cam follower 127 disengages with the operating pawl 128 of the spring clutch 122 and a pump shaft 129 connected to the drive coupling will be rotated through the clutch assembly.

As shown in Figure 1, the shaft 17 attached to the container 14 extends through a bearing assembly indicated generally at 18. More specifically, the bearing assembly includes an inner housing 130 which carries spaced anti-friction bearing means 131 to journal the shaft 17 and the inner housing 130 is nested within spaced rings of resilient material indicated at 131a inserted between the inner housing 130 and an outer housing 132 carried by the stationary casing 19 of the machine. Thus, the container 14 is resiliently mounted to cushion any vibration arising during rotational operation of the container 14.

Moreover, if any vibration or movement of the shaft 17 is induced by unbalanced loads during rotation of the container 14, the range of movement is sufficient to be sensed or detected by a suitable sensing device indicated at 133 mechanically connected as at 134 to switching means 136 which are in electric circuit with the control means for the machine as shown in Figure 7.

For example, if the container 14 is rotated at centrifuging speed and the load contained therein is unbalanced so as to produce excessive movement or vibration, continued operation of the machine at centrifuging speed is prevented and the machine is caused to return to a low speed to effect redistribution of the materials within the container 14.

In accordance with the principles of the present invention, however, whenever operation of the driving means at high speed is prevented during excessive vibration of the machine, the drive means automatically enters into an acceleration period which, as described above, occurs between any transition of the machine between slow and high speed gradually over an appreciable period of time in the range of from about 5 to 30 seconds.

The advantages of such an arrangement are that excessive vibration is not likely to develop until the machine has attained a considerable speed and by partaking of a slow acceleration from slow to high speed, a maximum amount of liquid is removed from the goods within the container during the acceleration period, thereby making the problem of "balance" one which is easier to dispose of by a subsequent redistribution of the goods. The same characteristic, of course, is true of the gradual deceleration if the sensing means 133 detects an excessive vibration and causes the machine to revert from high speed towards low speed through the acceleration period.

Figure 2:
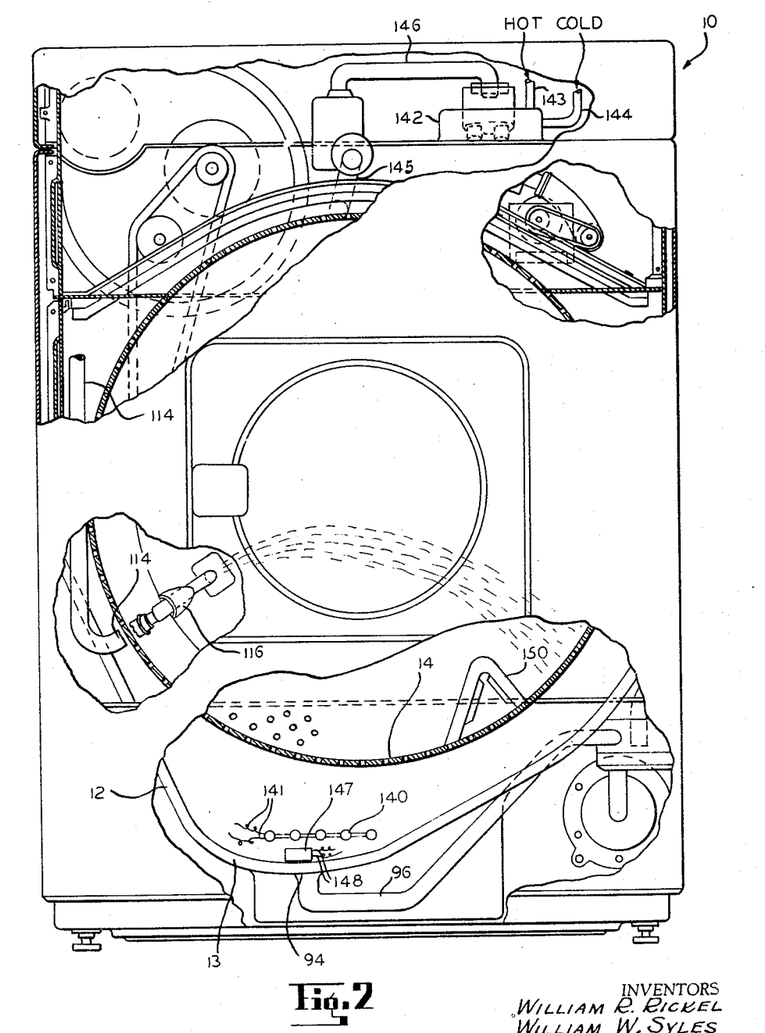
Figure 2 is a front elevational view with parts broken away of the machine shown in Figure 1 and illustrating additional details of construction.

As shown in Figure 2, there is provided in the reservoir 13 an immersion heater 140 having electrical conductor means 141 connected therewith leading to the control means of Figure 7. A thermostatic mixing valve 142 is shown connected to a domestic supply of water including a hot water inlet 143 and a cold water inlet 144. The mixed supply of water exits the mixing valve 142 through a conduit 146 and is discharged as at 145 into the treatment zone whereupon the liquid tends to collect in a pool at the bottom of the reservoir 13.

In accordance with the principles of the present invention, a temperature-responsive means indicated generally at 147 is located in the reservoir 13 and is subjected to the temperature of the laundry liquid contained therein. The temperature-responsive means 147 is electrically connected as at 148 to the control means of Figure 7 and operates to temporarily stop the cycle of washing, rinsing and drying periods during the operation of the heating means 140 and to resume the cycle only after the laundry liquid is elevated to a predetermined operating temperature.

Although the heating means is illustrated in Figure 2 as an immersion heater 140 which would be electrically energized through the conductor means 141, it will be appreciated that gas heating means could be employed as well.

By way of summarization, a typical laundering sequence will be described.

First of all, a quantity of soiled textile materials is placed within the interior of the drum 14 through the opening in the front thereof. Electrical controls for the regulation of water temperature, and for control of the washing and drying cycles are preset in advance by utilization of the control means shown in Figure 7. Thus, no further manual intervention will be required.

The washing cycle is initiated by the introduction of a charge of water from the fresh water inlet 145. The water enters the conduit 146 through the electrically-operated thermostatically-controlled mixing valve 142 of a type well known to those skilled in the art. The thermal override or temperature-responsive means 147 is provided and is so connected in the control circuit as to temporarily stop further operation of the cycle until the laundering liquid attains a predetermined operating temperature. A float switch (not shown) is also provided and is so connected in the control circuit as to shut off the supply of water through the mixing valve 142 when the level of the water in the sump or reservoir 13 reaches a predetermined level. A suitable supply of detergent is introduced into the sump or reservoir 13 by manual or automatic means either while water is being supplied or after the desired level has been reached.

The motor 21 is energized to rotate the drum 14 in one direction. The clothes are elevated against the forces of gravity and in this connection, it will be noted that the interior of the drum may be provided with one or more baffles 150 to assist in lifting the clothes. By elevating the clothes against the forces of gravity through an appreciable distance thereafter dropping the clothes subject to the forces of gravity through an appreciable distance, the gravitational acceleration of the falling clothes will be abruptly checked by impact against the hard non-liquid surface of the inside of the drum 14. During the washing cycle, the pump 108 will supply a continuous stream of laundry liquid through the water inlet 116, thereby saturating the clothes and insuring flexure of the textile fibers in the presence of an adequate supply of laundry liquid and a resupply of laundry liquid to the clothes to replace that flushed from the clothes by their impact against the solid surface of the lower portion of the drum 14. The liquid leaving the drum is collected in a pool below the level of the treatment zone and the laundry liquid from the pool in the reservoir 13 is returned by the pump 108 to supply a continuous stream of laundry liquid into the drum during the washing portion of the cycle.

After the clothes have been washed in this manner, rinsing liquid is projected over the tumbling clothes, thereby rinsing away the laundry liquid and further contributing to the cleansing of the clothes. Rinsing liquid is introduced through the fresh water inlet 145 introduction of the rinsing liquid being commenced, if desired, before the laundry liquid in the reservoir 13 is drained away. After the laundry liquid has been drained away, rinsing liquid can be collected in the sump or reservoir 13 for recirculation over the tumbling clothes to provide additional rinsing. During the washing and rinsing periods, of course, the laundry liquid is continuously filtered through the filter tray 101, a filtering device which can be selectively cleaned by the operator at will.

When the rinsing cycle is complete, the shaded pole motor 62 will be energized to actuate the gear unit 66 whereupon the link chain 79 will be wound on the spool of the pulley 76 and the bracket 38 will be actuated over an appreciable period of time in the range of from about 5 to 30 seconds. Accordingly, the drum or container 14 will be gradually and progressively accelerated from a low tumbling speed to a high centrifuging speed and the clothes will be evenly distributed in the form of an annulus against the walls of the drum. In the event the clothes are unevenly distributed and the unbalance produces excessive vibration, the sensing means 133 will actuate suitable switching means 136 to temporarily de-energize the shaded pole motor 62, whereupon the machine will revert to an acceleration cycle and the operation of the drum 14 will be returned to low speed. The switching means 136 are preferably of the type including time delay control elements so that the reversion to low speed will be of a temporary nature and the drum 14 will again be accelerated to high speed. Rotation of the clothes in the gradual and progressive acceleration periods over an extended period of time will physically remove a major portion of the liquid from the clothes and will greatly facilitate attainment of a steady state centrifuging operation so that a desirable extraction of liquid from the clothes may be effected during the centrifuging period.

Either during or after the extracting cycle, a stream of air is supplied through the treatment zone to permit air to be drawn through the drum 14 in conditioning contact with the tumbling clothes. It will be understood that during the drying operation, the drum is again returned to a speed to effect a tumbling action on the clothes. If it is desired to enhance the water-entraining properties of the air, suitable heating means are activated to supply thermal energy for heating the drying air.

If desired, the heating means may be deactivated near the end of the drying cycle whereupon cool air will be drawn through the treatment zone.

Having passed through the various stages of the laundering operation successively, the completely cleaned and dried clothes are ready for removal from the machine.

Figure 8:
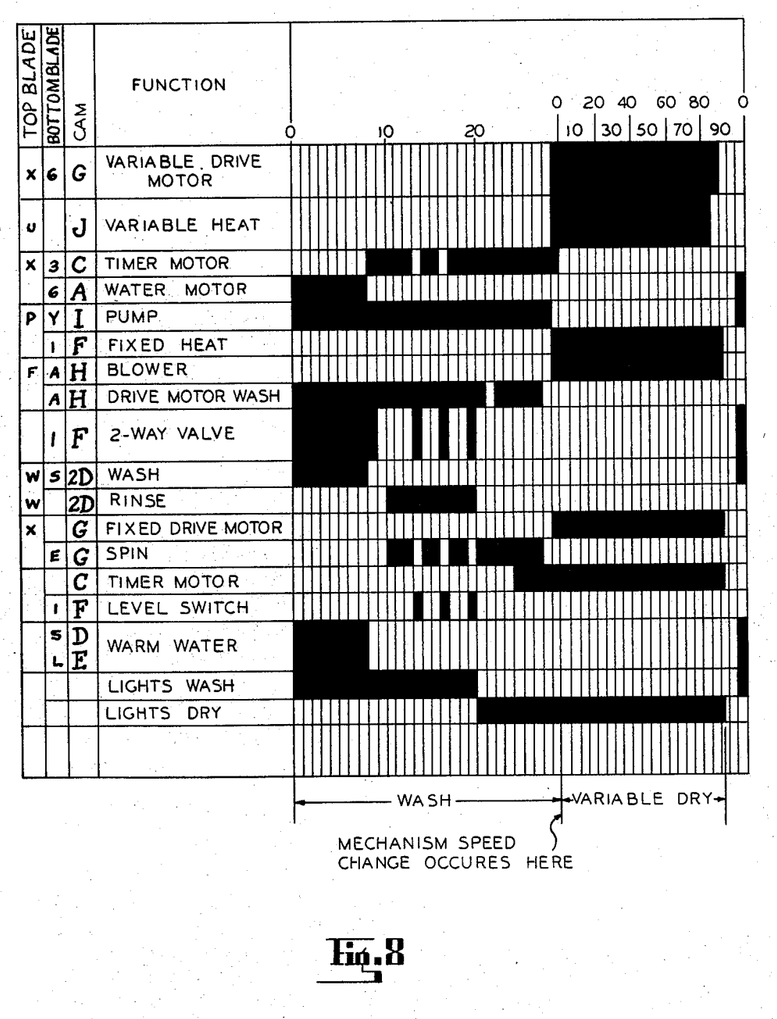
Figure 8 is a diagrammatic view illustrating the program of operation effected in accordance with the preselection made by the operator in the adjustment of the sequential controller of Figure 7.
Figures 9, 10:
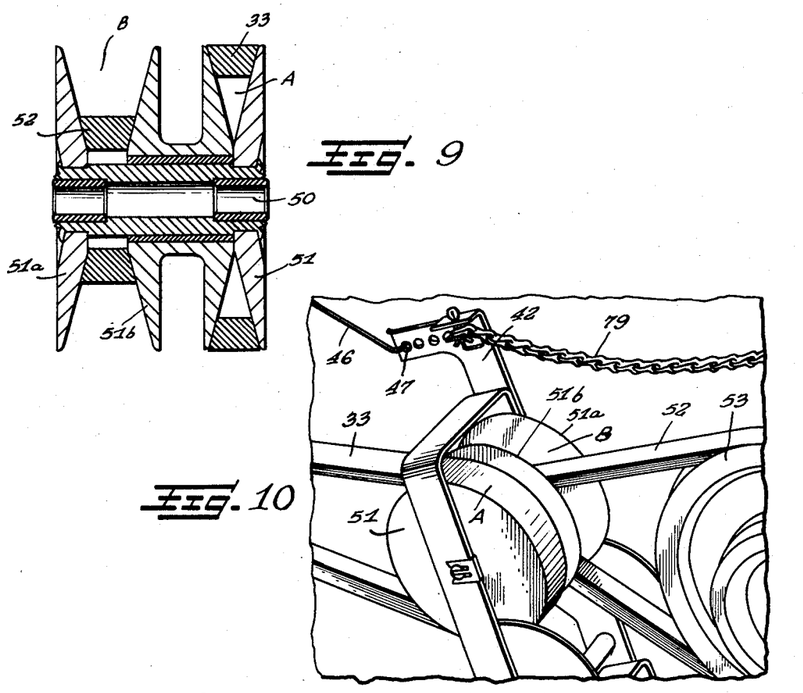
Figure 9 is a cross-sectional view through the pulley sheave members 51 of Figure 3.
Figures 10 and 11 are views showing the different positions of the pulley sheave members during tumbling and spinning speeds, respectively.
Figure 11:
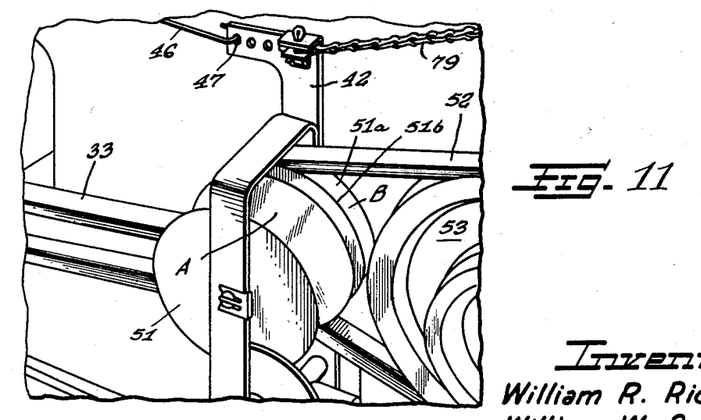

The program of operation just described is provided by the presettable sequential control means indicated generally in the form of a circuit diagram of Figure 7. The actual program of operation is illustrated by the program chart of Figure 8. A plurality of cams indicated by legend in consecutive alphabetical letters A through J, inclusive, are driven by a timer motor 200 and the various cams A–J, inclusive, are each associated with movable blades of corresponding switches connected in circuit with the devices to be controlled. The solenoids of the mixing valve 142 are indicated at 201 for the hot water solenoid and 202 for the cold water solenoid. The water heater relay for the immersion heater 140 is indicated at 203. The thermostatic control means 147 is shown in circuit to temporarily stop the cycle of washing, rinsing and drying periods until the laundry liquid attains a predetermined operating temperature.

The two-way valve 111 having the electric control motor 112 is also incorporated in the wiring diagram of Figure 7 as is the shaded pole motor 62 and the switching means 136. The pulley 31 controlled by the solenoid 30 is for operating the blower of the air dryer system and the blower solenoid is indicated at 30. The water level switch is indicated in Figure 7 at 204.

Although various minor modifications might be suggested by those versed in the art, it should be understood that we wish to embody within the scope of the patent warranted hereon all such modifications as reasonably and properly come within the scope of our contribution to the art.

We claim as our invention:

1. A variable speed transmission for use in a washing machine of the type having a rotatable drum in which clothes are washed with said drum being centrifuged and driven by a substantially constant speed means, said variable speed transmission comprising first, second and third spaced apart disks each formed to provide confronting tapered belt faces and together providing a pair of adjacent V-belt grooves in one of which is a belt adapted to be driven by said constant speed means and in the other of which is a belt adapted to be operatively connected to the drum, the middle one of said disks being axially movable with respect to the other two disks, a movable bracket having a support upon which said disks are carried to adjust the position of the axis of said disks, actuating means connected to said movable bracket, the center one of said disks and the other disks being relatively movable laterally in response to actuation of said bracket to alter in opposite relation the depth at which the respective belts engage the belt faces, thereby to change the speed ratio between the belts to rotate the drum at centrifuging speed, said actuating means including a rotatable motor means, a reducing gear unit having an output shaft connected to said motor means and driven thereby at reduced rotational speed, and a take-up means attached to said output shaft and to said bracket whereby said bracket is gradually actuated over an appreciable period of time in the range of from about 5 to 30 seconds, thereby to slowly accelerate said drum between washing and centrifuging speeds.

2. A laundry machine comprising a container normally rotatable about a generally horizontal axis for washing at a low speed and for extracting at a high speed, two-speed driving means therefor, a control means for said two-speed driving means comprising shiftable means having two positions corresponding to said two speeds and a motor having a gear reduction unit with an output shaft rotatable at reduced speed, and take-up means connected to said output shaft and actuated thereby to operate said shiftable means of said two-speed driving means to a shifted position over an appreciable period of time amounting to at least 5 seconds.

3. In a machine of the type including a container normally rotatable about a generally horizontal axis for washing at a low speed and for extracting at a high speed and driven by two-speed driving means including a variable drive pulley assembly having a pivotally mounted dual pulley idler unit with continuous biasing means normally loading said idler unit in one direction to operate said two-speed driving means at a slow speed, the improvement of a motor control unit to move said idler unit to operate said two-speed driving means at high speed, said motor including a gear reduction means having an output shaft rotatable at slow speed and take-up means connected between said output shaft and said idler unit to actuate said idler unit over an appreciable period of time of at least about 5 seconds, thereby to gradually accelerate the driving means between the low and high speeds.

4. In a machine of the type including a container normally rotatable about a generally horizontal axis for washing at a low speed and for extracting at a high speed, and driven by a two-speed driving means including a variable drive pulley assembly having a pivotally mounted dual pulley idler unit, continuously biased in one direction to operate said two-speed driving means at a slow speed, the improvement of a motor control unit to move said idler unit in a direction to operate said two-speed driving means at high speed, said motor including a gear reduction means having an output shaft rotatable at slow speed and a chain connected between said output shaft and said idler unit and taken up by said output shaft upon rotation thereof.

5. A variable speed transmission for use in a washing machine having a rotatable drum in which clothes are washed and centrifuged with said drum being driven by a substantially constant speed means, said variable speed transmission comprising first, second and third spaced apart pulley sheave members each formed to provide confronting tapered belt faces and together providing a pair of adjacent V-belt grooves in one of which is a belt adapted to be connected to said constant speed means and in the other of which is a belt adapted to be operatively connected to the drum, the middle one of said pulley sheave members being axially movable with respect to the other two pulley sheave members, a movable bracket having a support upon which said pulley sheave members are carried to adjust the position of the axis of said pulley sheave members, and actuating means connected to said movable bracket, the center one of said pulley sheave members and the outer pulley sheave members being relatively movable laterally in response to actuation of said bracket to alter in opposite relation the depth at which the respective belts engage the belt faces, thereby to change the speed ratio between the belts to rotate the drum at increased speed for centrifuging, said actuating means comprising a shaded pole electric motor having a drive shaft operatively connected to a gear reduction unit, said gear reduction unit having an output shaft rotatable at a much lower rate of rotational speed than the drive shaft of said shaded pole electric motor, a pulley having a spool portion rotatably connected to said output shaft of said gear reduction unit, and a link chain connected to said spool portion and taken up thereby upon rotation of said pulley, the other end of said link chain being connected to said movable bracket, thereby to adjust the position of the axis of said pulley sheave members over an appreciable period of time of at least about 5 seconds.

6. A variable speed transmission comprising first, second and third spaced apart pulley sheave members each formed to provide confronting tapered belt faces and together providing a pair of grooves in one of which is a belt from a constant speed source and in the other of which is a belt to a device to be driven at varying speeds, the middle one of said pulley sheave members being axially movable with respect to the other two pulley sheave members, a movable bracket having a support upon which said pulley sheave members are carried to adjust the position of the axis of said pulley sheave members, the center one of said pulley sheave members and the outer pulley sheave members being relatively movable laterally in response to actuation of said bracket to alter in opposite relation the depth at which the respective belts engage the belt faces, thereby to change the speed ratio between the constant speed means and the device to be driven at varying speeds, and actuating means connected to said movable bracket comprising an electric motor having a rotatable drive shaft, a gear reduction unit connected to said drive shaft and having an output shaft rotatable at slow speed, and a take-up pulley driven by said output shaft and having a link chain connected thereto and to said movable bracket, whereby said variable speed transmission is gradually and progressively actuated over an appreciable period of time to afford gradual acceleration of said device upon actuation of said actuating means.

7. In a laundry apparatus provided with a rotatable container for tumbling fabrics at a low speed and for centrifuging said fabrics at a higher extraction speed, means for rotating said container at said speeds comprising drive means, a movable supporting member, a plurality of coaxially aligned pulley sheaves revolubly mounted on said supporting member, said pulley sheaves including an intermediate pulley sheave axially movable relative to the other of said pulley sheaves to provide a pair of pulleys of variable diameter, a first belt trained over one of said pulleys and connected to said drive means, a second belt trained over the other of said pulleys for driving said container, bias means tending to move said supporting member toward a first position to tension said second belt and shift said intermediate pulley sheave axially relative to said other pulley sheaves to thereby effect a low speed ratio between said drive means and said container for tumbling said fabrics, and power take-up means connected to said movable supporting member for gradually moving said movable supporting member into a second position within a period of five to thirty seconds to relieve the tension in said second belt for automatically varying the effective diameters of said pulleys to gradually accelerate said container from said tumbling speed to said higher extraction speed and effect a gradual distribution and fluid extraction of said fabrics within said container.

8. In a laundry apparatus as defined in claim 7, said power take-up means including a shaded pole motor having a driving connection with said movable supporting member.

9. In a laundry apparatus as defined in claim 7, a sensing means responsive to a predetermined degree of lateral deviations of said rotatable container and temporarily terminating the operation of said power take-up means for thereby limiting movement of said movable supporting member toward said second position in response to an unbalanced condition within said container.

10. In a laundry apparatus as defined in claim 9, said power take-up means including a shaded pole motor controlled by said sensing means and having a driving connection with said movable supporting member.

11. In a laundry apparatus provided with a drive means and a rotatable container driven thereby for tumbling fabrics at a low washing speed and for centrifuging said fabrics at a higher extraction speed, the improvement of a movable supporting member, a plurality of coaxially aligned pulley sheaves revolubly mounted on said supporting member, one of said sheaves being axially movable relative to the other of said pulley sheaves adjoining opposite sides of said one sheave to provide a pair of pulleys of variable diameter, a first belt trained over one of said pulleys and adapted to be connected to the drive means, a second belt trained over the other of said pulleys for driving said container, bias means tending to move said supporting member toward a first position to tension said second belt and to shift said one pulley sheave axially relative to said other pulley sheave to thereby effect a low speed ratio between said first and second belts, whereby the belts are adapted to rotate the container for tumbling said fabrics, and power take-up means connected to said movable supporting member for gradually moving said movable supporting member into a second position within a period of 5 to 30 seconds to relieve the tension in said second belt for automatically varying the effective diameters of said pulleys to gradually change the speed ratio between the belts, whereby the belts are adapted to accelerate the container from tumbling speed to a higher extraction speed and effect a gradual distribution and fluid extraction of said fabrics within the container.

12. A laundry machine drive mechanism comprising a rotatable container in which clothes are washed at a first speed and centrifuged at a higher speed, a constant speed motor means to rotatably drive said container, a variable speed transmission operatively interconnecting said motor means and said container and having means establishing first and second speed ratios corresponding to said first speed and said higher speed of said container, shiftable means for actuating said transmission to change said speed ratios and having a first position corresponding to said first speed and said first speed ratio and a shifted position corresponding to said higher speed and said second speed ratio, and slow acting control means gradually shifting said shiftable means from said first position to said shifted position in an appreciable period of time ranging from about 5 to 30 seconds, said slow acting control means comprising a motor, a gear reduction unit and a pulley driven by said motor through said gear reduction unit and a connecting means taken up on said pulley at one end and connected at its opposite end to said shiftable means.

13. A laundry machine comprising a container normally rotatable about a generally horizontal axis for washing at a low speed and for extracting at a high speed, two-speed driving means therefor, a control means for said two-speed driving means comprising shiftable means having two positions corresponding to said two speeds, a motor having a gear reduction unit with an output shaft rotatable at reduced speed, and take-up means connected to said output shaft and actuated thereby to gradually shift said shiftable means of said two-speed driving means to a shifted position over an appreciable period of time ranging from about 5 to 30 seconds.

14. A laundry machine as defined in claim 13, and means for preventing the operation of said driving means at high speed during excessive vibration of the machine.

15. A laundry machine as defined in claim 13, and means responsive to movements of said container induced by improper distribution of materials therein to prevent continued operation of said driving means at said high speeds.

16. A machine comprising a container normally rotatable about a generally horizontal axis for washing at a low speed and for extracting at a high speed, two speed driving means including a variable drive pulley assembly having a pivotally mounted dual pulley idler unit, continuous biasing means normally loading said idler unit in one direction to operate said two-speed driving means at a slow speed, and a motor control unit to move said idler unit in an opposite direction, thereby to operate said two-speed driving means at high speed, said motor control unit including a gear reduction means having an output shaft rotatable at slow speed and take-up means connected between said output shaft and said idler unit to actuate said idler unit over an appreciable period of time of at least about 5 seconds, thereby to gradually accelerate the driving means between the low and the high speeds.

17. A machine comprising a container normally rotatable about a generally horizontal axis for washing at a low speed and for extracting at a high speed, two-speed driving means including a variable drive pulley assembly having a pivotally mounted dual pulley idler unit continuously biased in one direction to operate said two-speed driving means at a slow speed, and a motor control unit to move said idler unit in a direction to operate said two-speed driving means at high speed, said motor control unit including a gear reduction means having an output shaft rotatable at slow speed and a chain connected between said output shaft and said idler unit and taken up by said output shaft upon rotation thereof.

18. A washing machine having a rotatable drum in which clothes are washed and centrifuged, substantially constant speed means for rotating the drum, and a variable speed transmission between said constant speed means and said drum for rotating said drum at centrifuging speed, said variable speed transmission comprising first, second and third spaced apart pulley sheave members each formed to provide confronting tapered belt faces and together providing a pair of adjacent V-belt grooves in one of which is a belt from said constant speed means and in the other of which is a belt to said rotatable drum, the middle one of said pulley sheave members being axially movable with respect to the other two of said pulley sheave members, a movable bracket having a support upon which said pulley sheave members are carried to adjust the position of the axis of said pulley sheave members, actuating means connected to said movable bracket, the middle one of said pulley sheave members and the outer pulley sheave members being relatively movable laterally in response to actuation of said bracket to alter in opposite relation the depth at which the respective belts engage the belt faces, thereby to change the speed ratio between the constant speed means and the drum for centrifuging, said actuating means comprising a motor having a drive shaft operatively connected to a gear reduction unit, said gear reduction unit having an output shaft rotatable at a much lower rate of rotational speed than the drive shaft of said motor, a pulley having a spool portion rotatably connected to said output shaft of said gear reduction unit, and a link chain connected to said spool portion and taken up thereby upon rotation of said pulley, the other end of said link chain being connected to said movable bracket, thereby to adjust the position of the axis of said pulley sheave members over an appreciable period of time of at least about 5 seconds.

References Cited in the file of this patent

UNITED STATES PATENTS

| | | |
|---|---|---|
| 2,389,774 | Haberstump | Nov. 27, 1945 |
| 2,516,327 | Kuhn | July 25, 1950 |
| 2,543,967 | Heyer | Mar. 6, 1951 |
| 2,548,316 | Locke | Apr. 10, 1951 |
| 2,556,490 | Chamberlin | June 12, 1951 |
| 2,757,531 | Fox | Aug. 7, 1956 |
| 2,764,884 | Constantine | Oct. 2, 1956 |
| 2,774,248 | DeMoss | Dec. 18, 1956 |
| 2,784,584 | Worst | Mar. 12, 1957 |
| 2,807,963 | Osterhus et al. | Oct. 1, 1957 |
| 2,836,046 | Smith | May 27, 1958 |
| 2,842,002 | Stegman | July 8, 1958 |

FOREIGN PATENTS

| | | |
|---|---|---|
| 699,794 | Great Britain | Nov. 18, 1953 |